(12) United States Patent
McKay et al.

(10) Patent No.: US 8,230,005 B2
(45) Date of Patent: Jul. 24, 2012

(54) SYSTEM AND METHOD FOR COLLECTING, TRANSFERRING AND MANAGING QUALITY CONTROL DATA

(75) Inventors: Michael J. McKay, Granger, IN (US); John M. Miller, Granger, IN (US); Phillip W. Caviness, Dowagiac, MI (US); Jason T. Driscoll, Chicago, IL (US); Michael D. Miller, Mishawaka, IN (US)

(73) Assignee: Smart Temps, LLC., Mishawaka, IN (US)

( * ) Notice: Subject to any disclaimer, the term of this patent is extended or adjusted under 35 U.S.C. 154(b) by 57 days.

(21) Appl. No.: 12/322,189

(22) Filed: Jan. 30, 2009

(65) Prior Publication Data

US 2010/0198905 A1    Aug. 5, 2010

(51) Int. Cl.
*G06F 15/16* (2006.01)
(52) U.S. Cl. ...................................... 709/203
(58) Field of Classification Search .................. 709/203, 709/217
See application file for complete search history.

(56) References Cited

U.S. PATENT DOCUMENTS

| | | | | |
|---|---|---|---|---|
| 7,508,768 | B2 * | 3/2009 | Yoon et al. | 370/252 |
| 2004/0049577 | A1 * | 3/2004 | Imhof | 709/224 |
| 2006/0234621 | A1 * | 10/2006 | Desrochers et al. | 454/239 |
| 2006/0294047 | A1 * | 12/2006 | Johnston et al. | 707/1 |
| 2007/0245086 | A1 * | 10/2007 | Odom et al. | 711/115 |
| 2008/0033256 | A1 * | 2/2008 | Farhan et al. | 600/300 |
| 2008/0120188 | A1 * | 5/2008 | Mobley et al. | 705/15 |
| 2008/0183421 | A1 * | 7/2008 | Chai | 702/173 |
| 2008/0276182 | A1 * | 11/2008 | Leow | 715/740 |
| 2010/0017466 | A1 * | 1/2010 | Trauner | 709/203 |
| 2010/0023866 | A1 * | 1/2010 | Peck et al. | 715/735 |

* cited by examiner

Primary Examiner — Jason Recek
(74) Attorney, Agent, or Firm — R. Tracy Crump

(57) ABSTRACT

The information system and method for collecting, transferring and administrating quality control data, and particularly HACCP data disclosed allows bi-directional communication between a plurality of remote wireless measurement devices and a central web server through a local com/data link. The com/data link provides wireless communication with the various measurement devices and communication with the web server via an Internet connection. An Internet based database and website interface provides centralized data storage and easily accessible data management and analysis. Administrator/users can access and manage the data from any location or device with Internet connectivity. The measurement devices allow their operation and functions to be configured and reconfigured by uploading customized device "data packets" into the devices system memory. The Internet-based user interface allows administrator/users to remotely customize and modify these "data packets" for each individual measurement device to suit each specific application. The bi-directional communication between the various wireless measurement devices and the web server allows administrator/users to reconfigure each individual measurement device remotely through an Internet-based user interface.

18 Claims, 18 Drawing Sheets

SYSTEM AND METHOD FOR COLLECTING, TRANSFERRING AND MANAGING QUALITY CONTROL DATA

This invention relates generally to techniques for collecting, transferring and managing quality control data, and relates specifically to a system and method of collecting, transferring and managing data from wireless remote measurement devices using a local data hub and an internet based information center for hazard analysis and critical control point (HACCP) safety assurance programs.

BACKGROUND OF THE INVENTION

Many industries use hazard analysis and critical control point (HACCP) principles as part of their quality control and assurance programs. Many industries are required by law to collect and document HACCP data to ensure safety standards. For example, school food authorities (SFAs) are required by various laws and regulations to implement a food safety program for the preparation and service of school meals. These food safety programs are based on hazard analysis and critical control point (HACCP) principles, which is a systematic approach designed to reduce the risk of food borne hazards by focusing on each step of the food preparation process—from receiving to service. Food safety programs require SFA to collect and manage data for each critical control point in the flow of food process. One critical control point for food safety is temperature. Temperature must be collected and monitored for each food item during each stage of the flow of food process from receiving to service. Upon receipt, cold foods must be kept cold and hot foods must be kept hot. Food must be cooked or prepared at proper temperatures and held at proper temperatures. Food safety programs are required to collect, monitor and report HACCP temperature data for each food item at every critical step in the flow of food process.

Information systems have been developed to automate the collection and administration of HACCP data. These information systems use a variety of sensor and measurement devices to collect critical point data and computer databases to manage and analyze the data. While automation has streamlined many aspects of the collection and administration of HACCP data, conventional information systems used for HACCP data collection and administration have suffered in several areas. Conventional HACCP information systems are still time and labor intensive. Any particular quality control and assurance program may require an information system to collect and administer HACCP data for a number of unique processes, each of which may have its own set of unique variables and parameters. Consequently, the information systems must collect and store data from any number of sensors and measurement devices for any one process. These sensors and measurement devices may be distributed across a large physical area. While sensors and measurement devices have employed various wired and wireless communication technologies to enable the electronic transfer of data to the information center, these sensors and measurement devices only streamline the assembly of collected data. Frequently, sensors or measurement device needs to be configured for parameters of each unique process. When processes change, each sensor and measurement device must be reconfigured for the new process. The reconfiguration of each sensor or device is labor and time intensive. Again using school food authorities as an example, the HACCP data collected may change daily with the menu being served as well as for each food item. This means that reconfiguring sensors and measurement devices must be performed frequently at the loss of time and labor.

Data loss has also been a problem. Various electronic sensors and measurement devices have been developed to conveniently collect and store critical point data using a wide range of technologies. These devices then transfer or download the collected data to some central information center for analysis and administration. When data is stored in a sensor or measurement device, any mechanical or electronic failure of that device often results in the loss of any data previously collected, but not yet transferred to the central information center.

SUMMARY OF THE INVENTION

In accordance with the present invention, an information system and method are disclosed for collecting, transferring and administrating quality control data, and particularly HACCP data. The information system and method of this invention allows bi-directional communication between a plurality of remote wireless measurement devices and a central web server through a local com/data link. The com/data link provides wireless communication with the various measurement devices and communication with the web server via an Internet connection. The web server hosts a database where collected temperature data is stored and managed and an Internet based user interface allows an administrator/user to access the database. The Internet based database and website interface provides centralized data storage and easily accessible data management and analysis. Administrator/users can access and manage the data from any location or device with Internet connectivity. The information system reduces the risk of data loss. Data backups are provided and maintained for the database on the web server. Both the measurement devices and the com/data link have data buffers, which are used to temporarily store data and other system information. The use of data buffers in both the local com/data link and each measurement device reduce the chance of data loss before or during transmission to the web server. The measurement devices are designed to allow their operation and functions to be configured and reconfigured by uploading customized device "data packets" into the device's system memory. The Internet-based user interface allows administrator/users to remotely customize and modify these 'data packets" for each individual measurement device to suit each specific application. The bi-directional communication between the various wireless measurement devices and the web server allows administrator/users to reconfigure each individual measurement device remotely through an Internet-based user interface.

The information system and method of this invention may be adapted for any quality control application. One embodiment of the information system and method of the present invention is presented as part of a food safety program for a school food authority (SFA), which is designed and intended to collect, transfer and manage temperature measurement data for each specific food item on the various menus and service lines at each of the SFA's preparation, storage and service locations. In this embodiment, temperature data is collected and transmitted from remote temperature measurement devices (TMDs) over a wireless connection to a com/data link and forwarded to the web server via an Internet connection.

Theses and other advantages of the present invention will become apparent from the following description of an embodiment of the invention with reference to the accompanying drawings.

BRIEF DESCRIPTION OF THE DRAWINGS

The drawings illustrate an embodiment of the present invention, in which.

DESCRIPTION OF THE PREFERRED EMBODIMENT

The present invention relates to an information system and methods for collecting, transferring and administrating quality control data, and particularly HACCP data. The information system of the present invention allows bi-directional communication between a plurality of remote measurement devices and a central web server, which hosts a database and an internet-based user interface. The bi-directional communication between the measurement devices and a central web server allows system administrators and users to reconfigure each individual measurement device remotely through the Internet-based user interface.

For simplicity of illustration and explanation only, an embodiment of the information system and method of the present invention is presented and disclosed herein as part of a food safety program for a school food authority (SFA), although the teaching of this invention can be readily adapted or modified for use with other quality control and assurance programs and applications. While this embodiment of the system and method is illustrated and described as part of a food safety program, one skilled in the art will recognize that the teaching of this invention may be used and adapted for any application. Various modifications to the disclosed embodiment will be readily apparent to those skilled in the art, and the generic principles herein may be applied to other embodiments. Thus, the present invention is not intended to be limited to an information system for a food safety program, but is to be afforded the widest scope consistent with the principles and teachings described herein.

Figure 1:
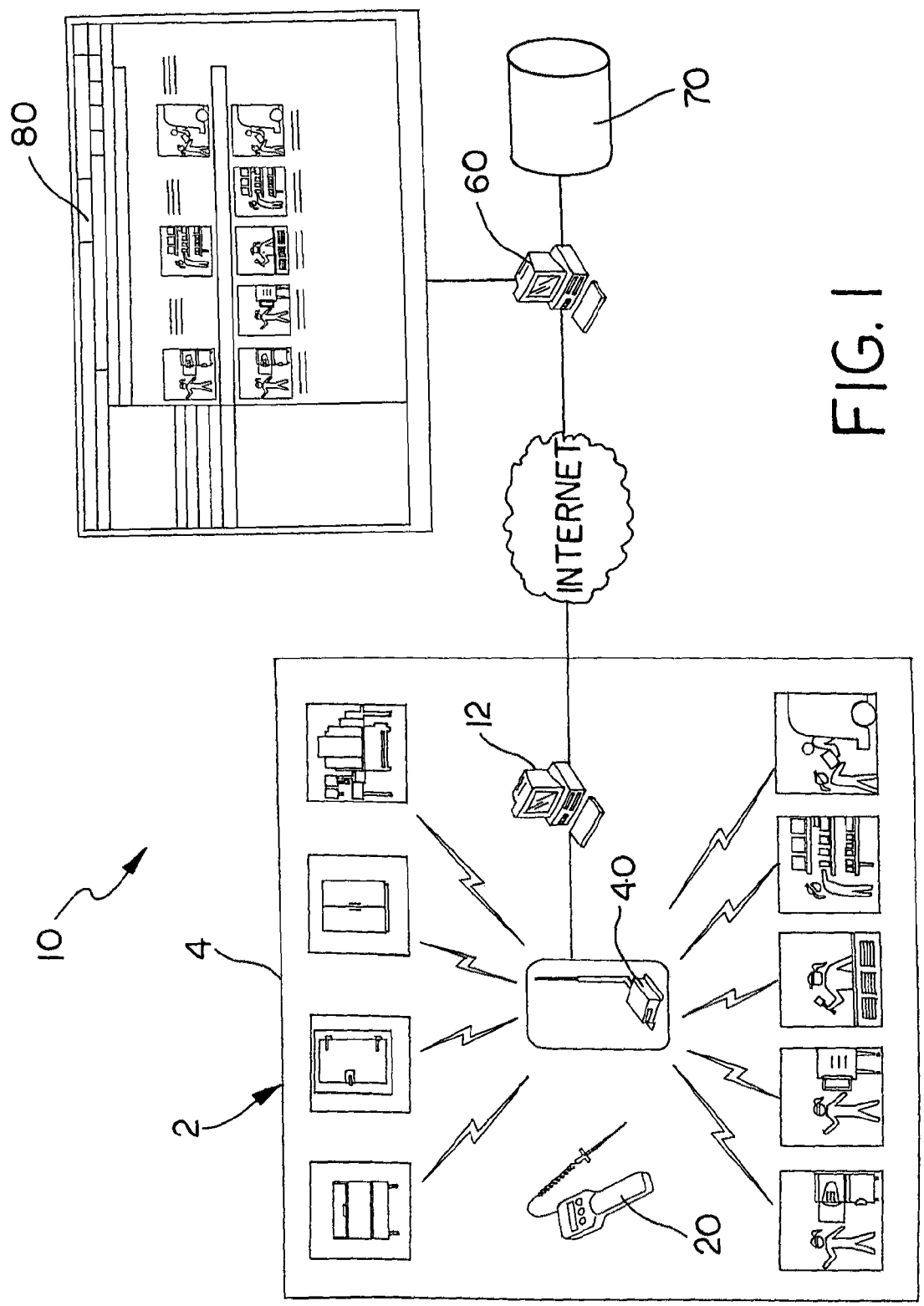
FIG. 1 is a schematic diagram showing an embodiment of the information systems of this invention as part of a food safety program for a school food authority.
Figure 2:
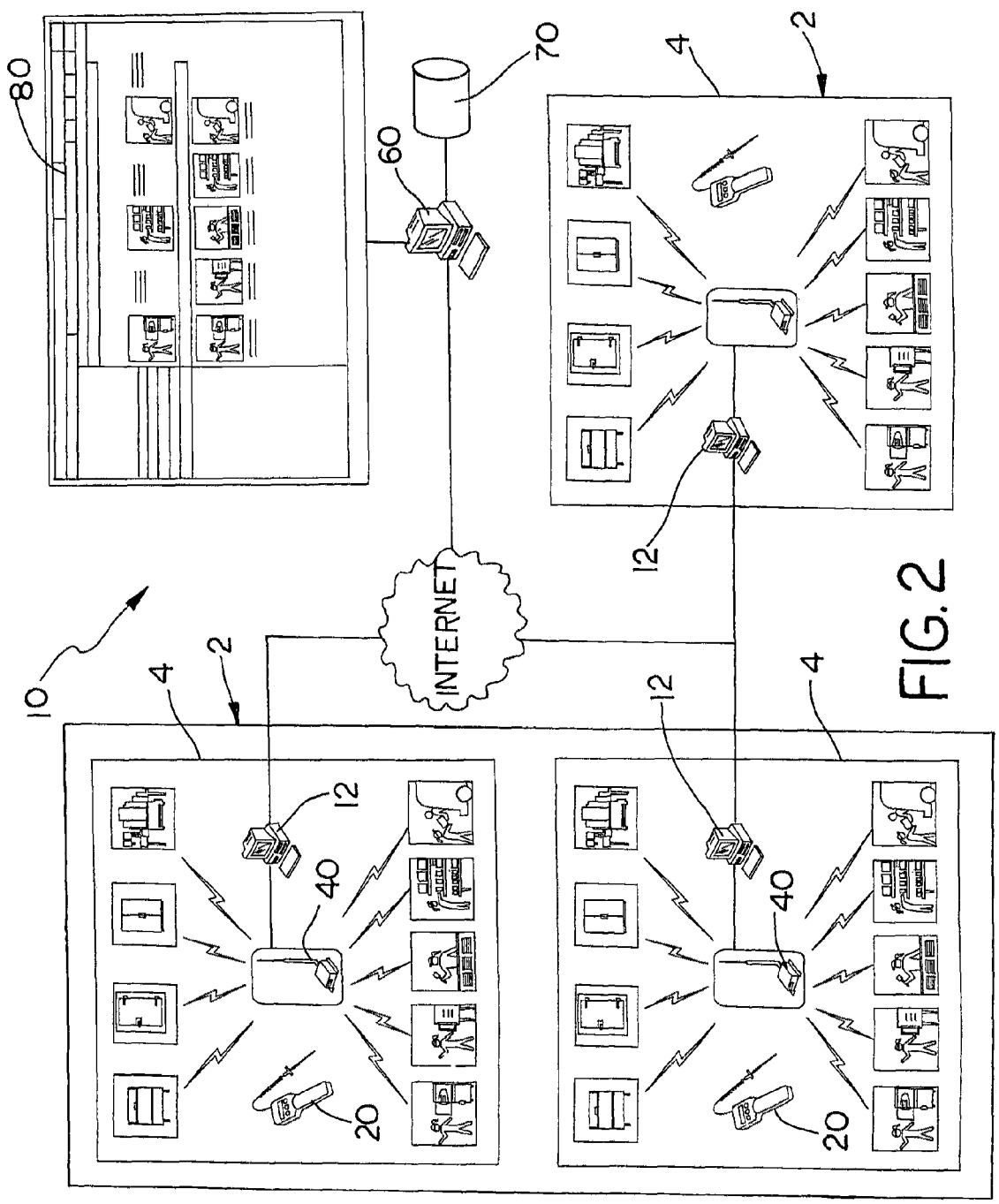
FIG. 2 is a schematic diagram showing a second embodiment of the information systems of this invention as part of a food safety program for a school food authority having multiple food service locations.

Referring now to the figures, a food safety information system, which represents an embodiment of the present invention, is designated generally as reference numeral 10. Information system 10 is designed and intended to collect, transfer and manage temperature measurement data for each specific food item on the various menus and service lines at each of the SFA's preparation, storage and service locations. Information System 10 allows this temperature data to be collected and managed from multiple measurement devices at multiple locations for any number of data items at every stop of the flow of food process. FIG. 1 illustrates information system 10 used to collect, transfer and manage temperature measurement data from a single service location. FIG. 2 illustrates information system 10 used to collect, transfer and manage temperature measurement data from multiple (three) service locations and for multiple SFAs (two).

As shown, information system 10 generally includes three basic hardware components: a plurality of wireless temperature measurement devices or TMDs 20, a local communication/data link (com/data link) 40 and a web server 60. TMDs 20 are the temperature data collection instruments of information system 10. Typically, a local system link 40 is placed at each food service location, such as a school cafeteria and operates in communication with multiple TMDs 20 at that food service location. Local com/data link 40 provides bi-directional communication between the web server 40 and any number of remote TMDs 20. Web server 60 hosts a database 70 where collected temperature data is stored and managed and an Internet-based user interface 80 for accessing the database.

Figure 4:
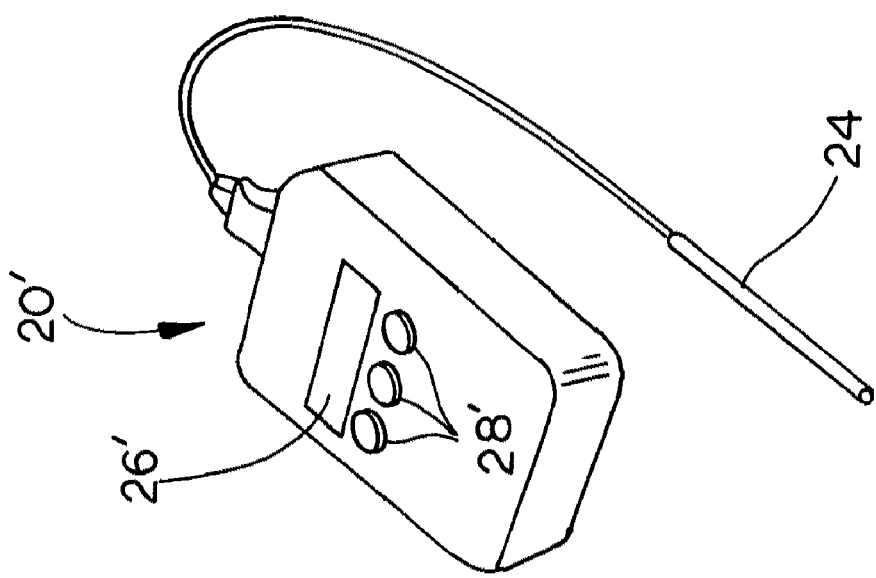
FIG. 4 is a perspective view of another embodiment of the temperature measurement device (TMD) of this invention.
Figure 3:
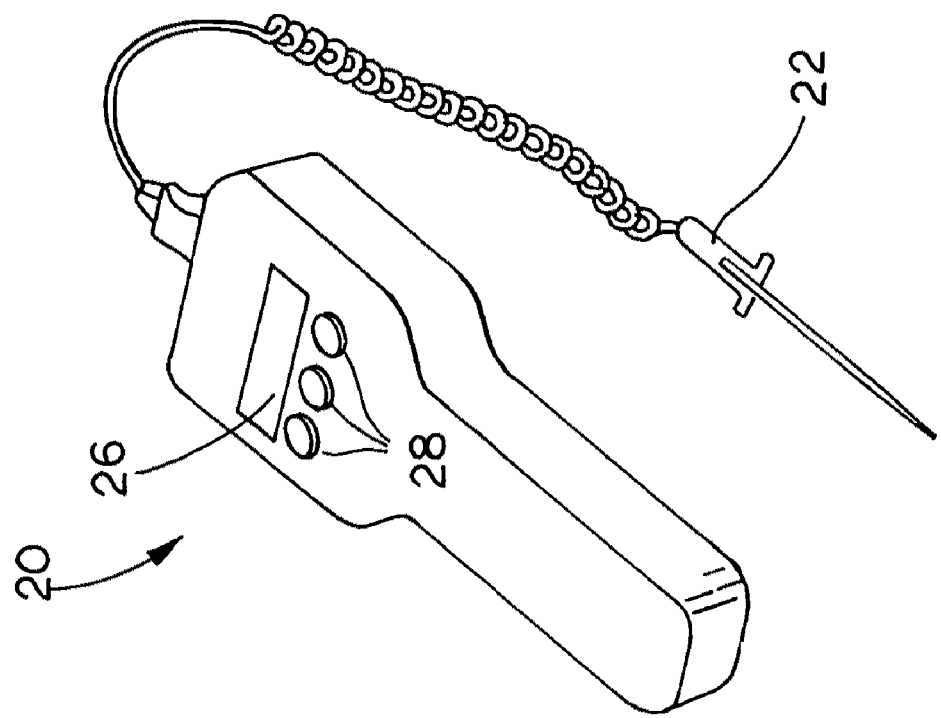
FIG. 3 is a perspective view of an embodiment of the temperature measurement device (TMD) of this invention.

As shown in FIGS. 3 and 4, TMDs 20 are electronic devices, which may be configured as mobile handheld units (FIG. 3) or fixed units (FIG. 4) in various embodiments. When configured as a mobile handheld unit, TMD 20 is generally intended to be carried and held by a user for collecting temperature readings for individual food items at different locations. When configured as a fixed unit, TMD 20 is generally intended to be mounted directly to coolers, freezers, ovens, fryers, cookers or other critical process locations for collecting temperature readings specifically for those locations. As shown, the various embodiments differ only in the external configuration of the device body where the mobile handheld TMD has a handle portion to allow the user to convenient hold and carry the TMD. The various embodiments of TMD 20 may have a detachable temperature probe 22 (FIG. 3) or detachable infrared sensor probe 24 (FIG. 4). In addition, the various embodiments of TMD 20 may have a graphic user interface 26 and an array of selector buttons 28, which allow the device users to interactively operate the devices. Alternatively, other embodiments of the TMDs may employ other types of user interfaces and controls within the teaching of this invention, such as keyboards, touch screens or speech-recognition modules with microphones, and the like.

Figure 5:
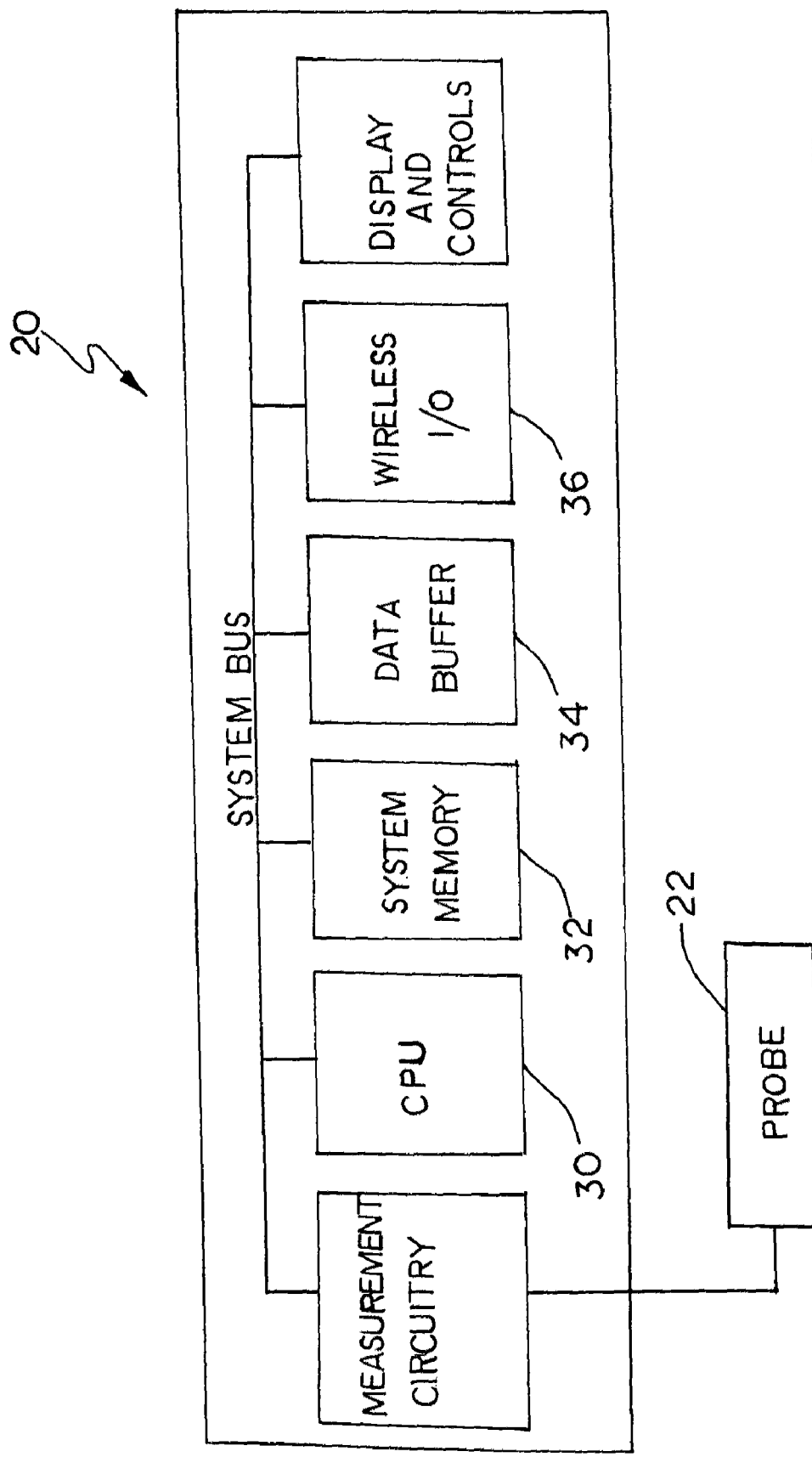
FIG. 5 is a schematic diagram of the temperature measurement devices (TMDs) of FIGS. 4 and 5.
Figure 6:
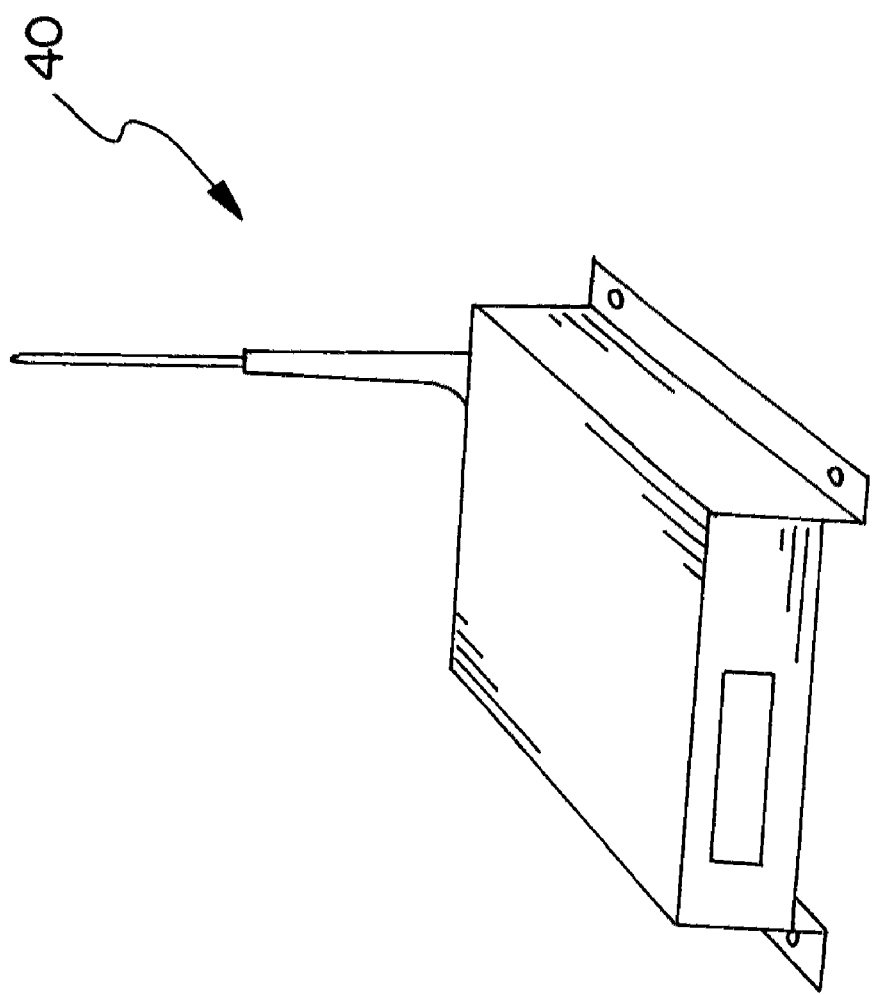
FIG. 6 is a perspective view of an embodiment of the com/data link of this invention.
Figure 7:
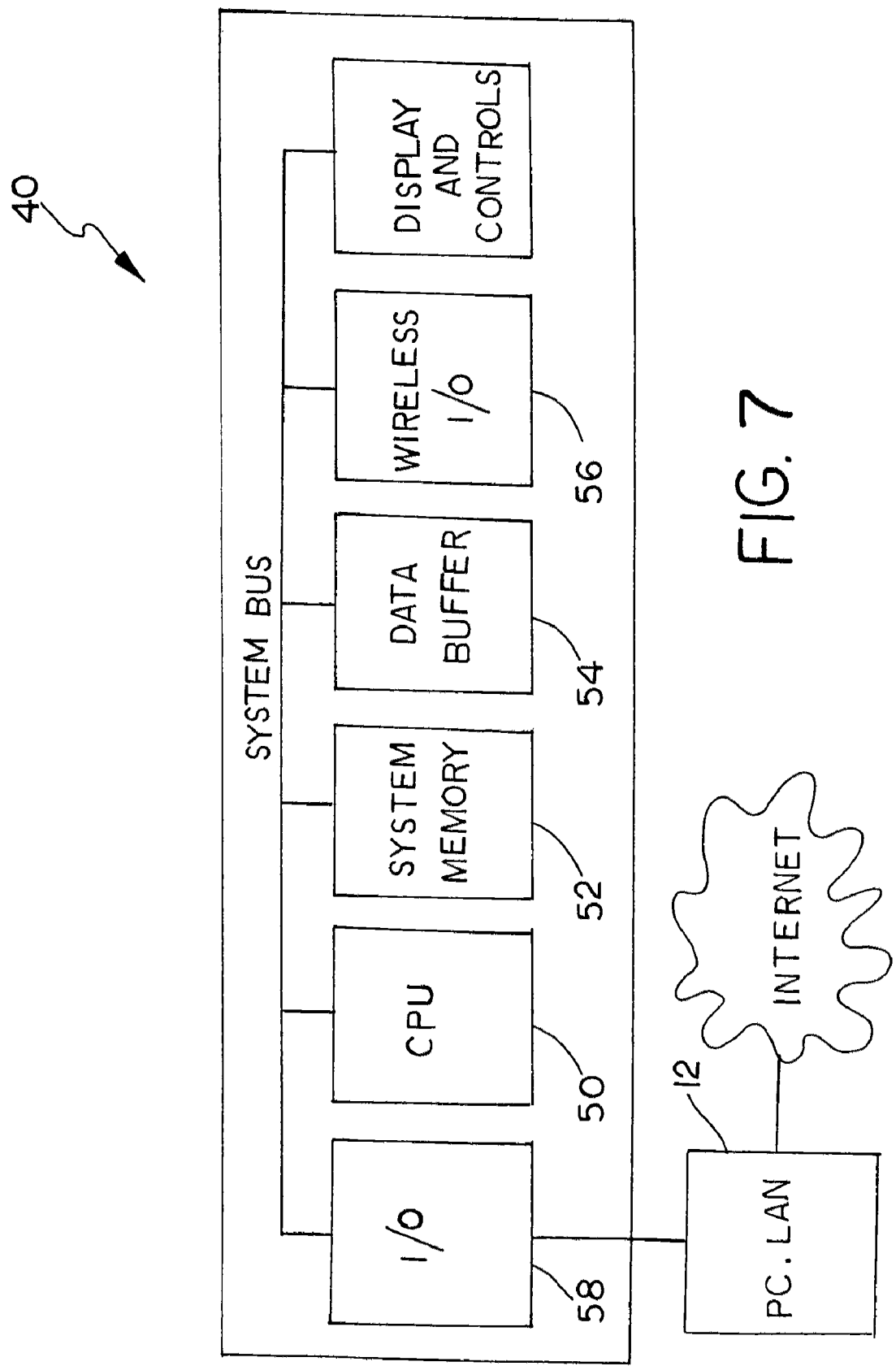
FIG. 7 is a schematic diagram of an embodiment of the com/data link.

The various embodiments of TMD 20 will use conventional electronic temperature measurement and calculation circuitry and components. As shown in FIG. 5, each embodiment of TMDs 20 may generally include some form of CPU processor 30, system memory 32, as well as, various other electronic components, circuits and systems. TMDs 20 also include internal data buffer 34 for temporarily storing collected temperature data and firmware updates. Generally, data buffer 34 is in the form of internal flash memory, but in other embodiments may be any suitable type of electronic memory. Furthermore, each embodiment of TMD 20 includes a wireless I/O interface 36, which supports bi-directional communication with local com/data link 40.

It should be noted that the various embodiments of TMD 20 are designed and intended to allow their operation and functions to be configured and reconfigured by uploading customized device "data packets" into device's system memory 32. These unique "data packets" may include updated firmware, device menus, new and redefined database fields and identifiers, settings and parameters, which the system administrator/user may define or establish for each measurement device as needed for the particular food safety program.

Local com/data link 40 facilitates the bi-directional communication between web server 10 and multiple TMDs 20. In certain embodiments, local system link 40 may have a graphic user interface 42 and an array of selector buttons 44, which allow the device users to interactively operate the unit, while other embodiments may have other types of user interfaces, such as switches, keyboards, touch screens, LED screens and lights to provide various status information and device control.

As shown in FIG. 3, local com/data links 40 include some form of CPU processor 50, system memory 52, a data buffer 54, a wireless I/O interface 56 and a wired I/O interface 58, as well as other electronic components, circuits and systems for processing the bi-directional transfer of data between web server 10 and the various TMDs 20. Data buffer 54 temporarily stores TMD "data packets" received from either web server 10 or collected temperature data received from TMDs 20.

Wireless I/O interface 56 provides bi-directional communication with wireless TMDs 20. Wireless I/O interface 56 may employ any suitable electronic circuitry and communication protocol or standards, which allow wireless bi-directional communication, such as, wireless USB, radio frequency (RF), Infrared, Blue Tooth®, Wibree™ and ZigBee™. Wired I/O interface 58 generally provides communication to Web server 10, but may also provide communication with other wired TMDs 20 (FIG. *). Wired I/O interface 58 may employ any suitable electronic circuitry and communication protocol or standards, which allow bi-directional communication, such as, IEEE 802.11, IEEE 802.15, USB and Ethernet as required for each particular application. Generally, wired I/O interface 58 connects system link 20 to a local computer and local area network (LAN) 12, which is connected to the Internet. Local com/data link 20 uses an Internet connection through this local computer or LAN 12 to establish bi-directional communication with web server 10. Alternatively, wired I/O interface 58 may allow connection with various other communication devices with internet access, such as cellular telephones, PDAs and laptop computers. Wired I/O interface 58 may also provide for connections to other hardware devices, such as removable storage devices and media, and other user interfaces.

Web server 60 hosts a database 70 where collected temperature data is stored and organized and a website user interface 80 that allows SFA administrator/users to use information systems to collect, store, analyze and manage the collected temperature data as part of a food safety program. Web server 60 may be physically located and operated by an individual SFA. However, the operation and maintenance of the web server 60 and the maintenance and administration of database 70 and software interface 80 may be performed as a contracted service for multiple SFAs. In such a case, web server 60 may be remotely located and accessed by each SFA using the Internet connection from their own computers and local area networks.

Database 70 uses a conventional relational database, which allows collected data to be organized, indexed, searched and reported for analysis by system administrators and users and is ideally coded using a structured query language or similar data constructions. Internet based user interface 80 is in the form of an Internet website, which can be accessed using an Internet browser, such as Microsoft Explorer or Mozilla Firefox. User interface 80 may employ user identifications, passwords, and other security and authentication procedures and methods to allow multiple SFAs with multiple administrator/users to simultaneously access and use information system 10 while maintaining the security and integrity of each's data and management by allowing each SFA administrator/user to access only their own data within the database 70. Furthermore, certain features, options, sections or pages of user interface 80 may only be accessed by those SFA administrator/users having the proper credentials, such as a proper identification number and password.

Website interface 80 allows SFA administrator/users to customize, configure, structure, define and organize data fields and parameters of the database to suit the specific needs and requirements of their food safety program. Through access to database 70 via user interface 80, SFA administrators/users may create, modify or update daily food service menus, lists of food items, flow of food process steps and parameters, and specific corrective actions for each critical control point of each step and food item. SFA administrator/users add and define the various data base fields, adding and subtracting specific food items, creating and selecting different item menus and specifying food items for individual serving lines.

Figure 8:
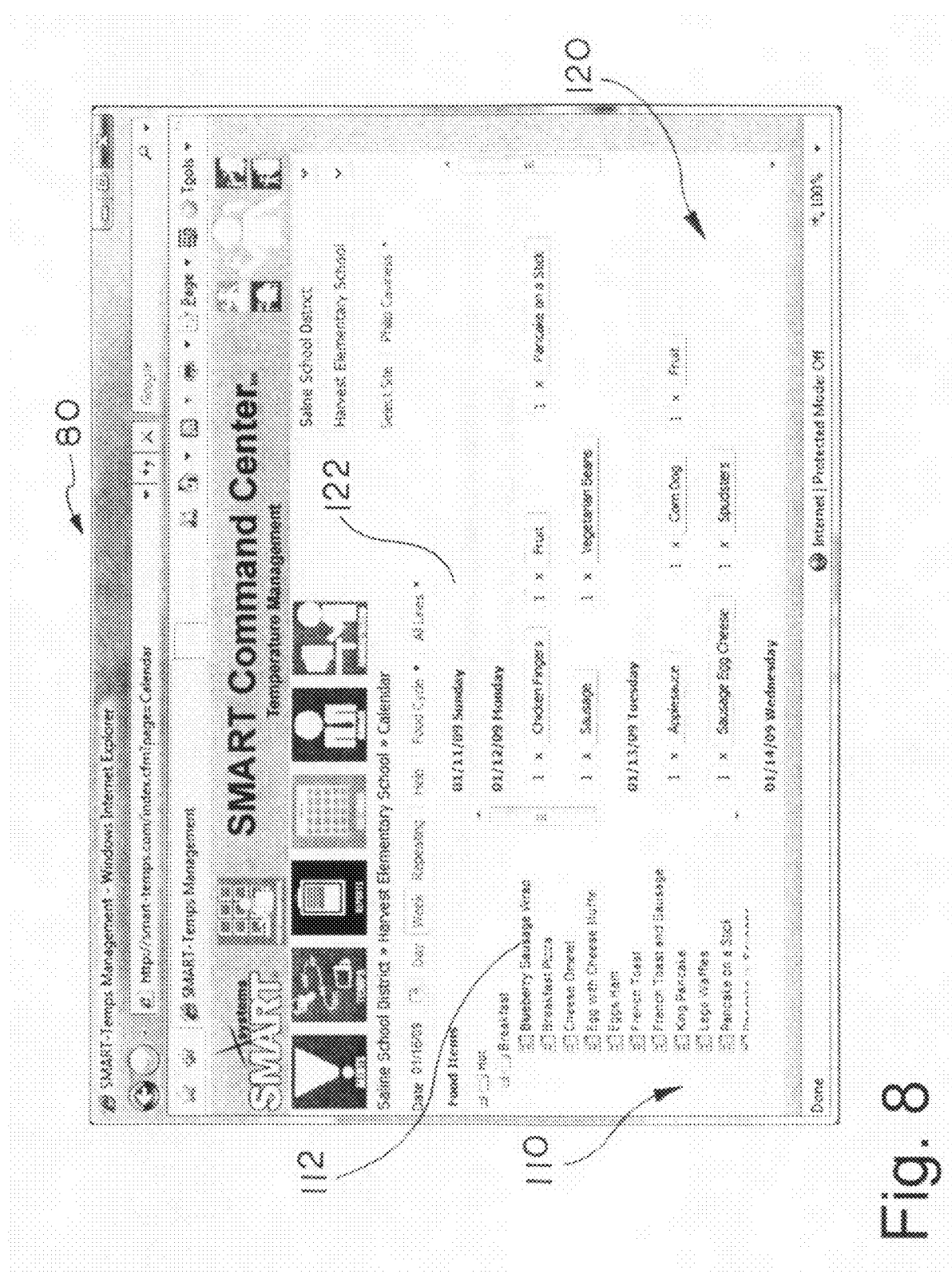
FIGS. 8-12 are screen shots of an embodiment of the Internet-based user interface of this invention, which illustrate how an administrator/user can customize the information system database for specific needs.
Figure 9:
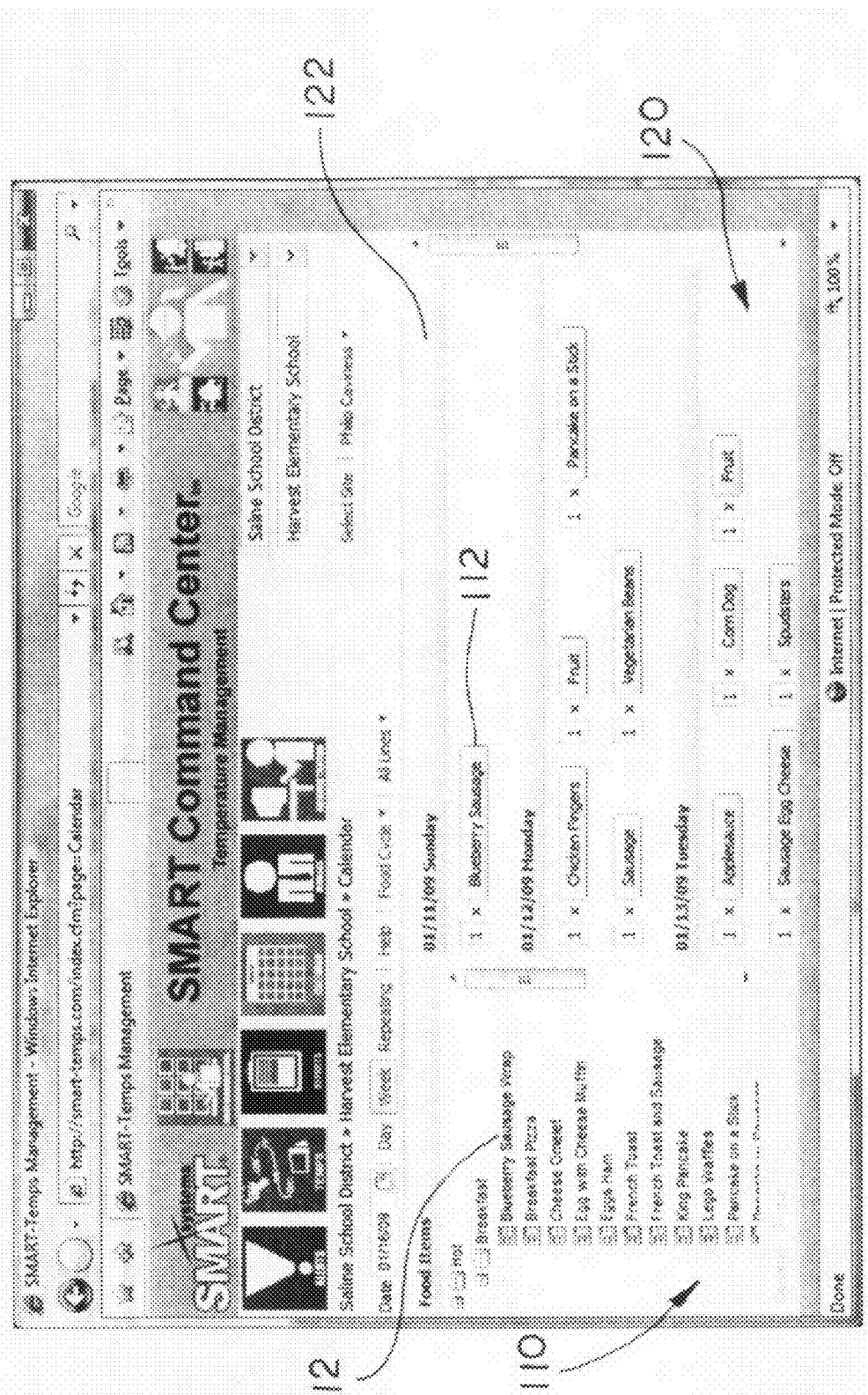
Figure 10:
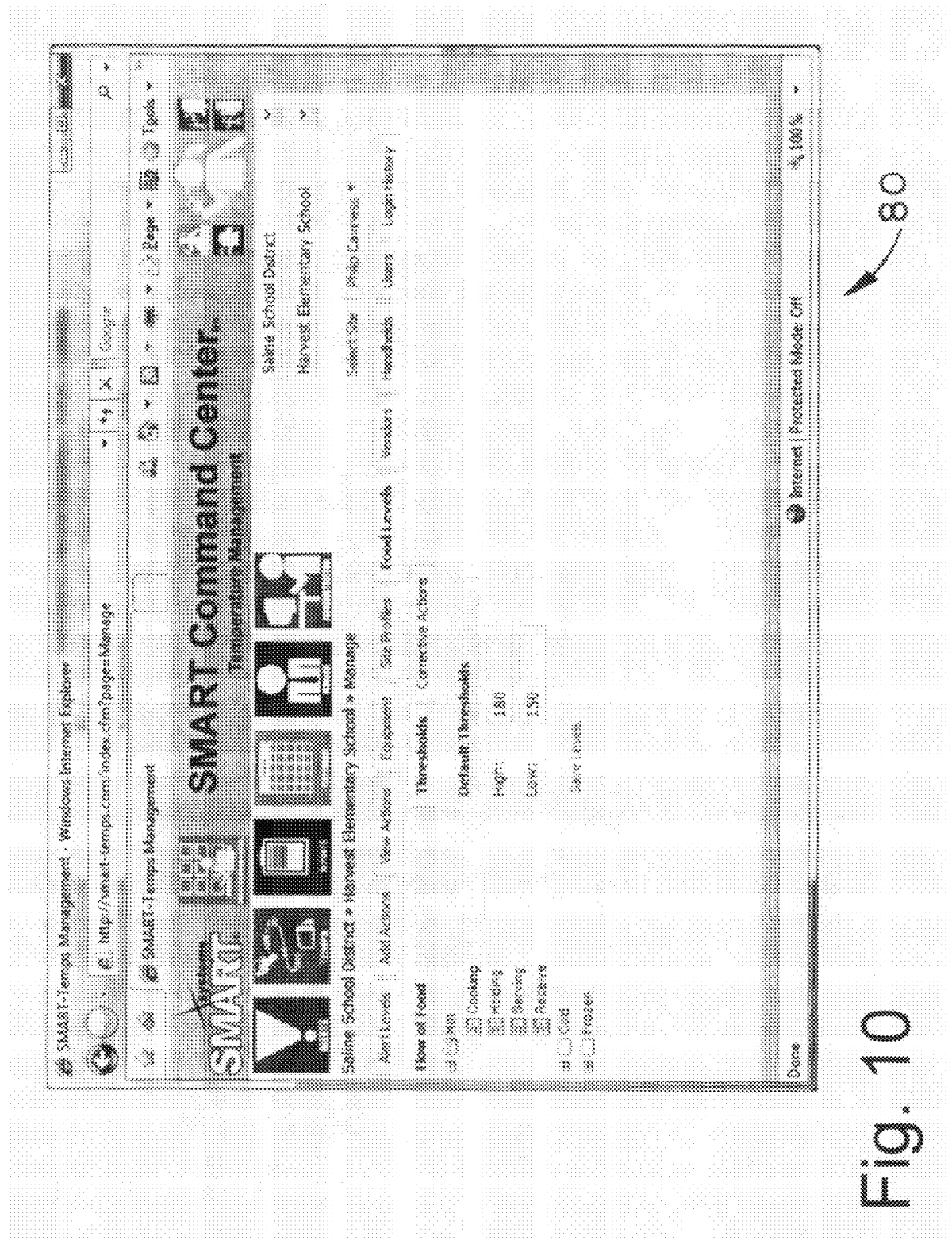
Figure 11:
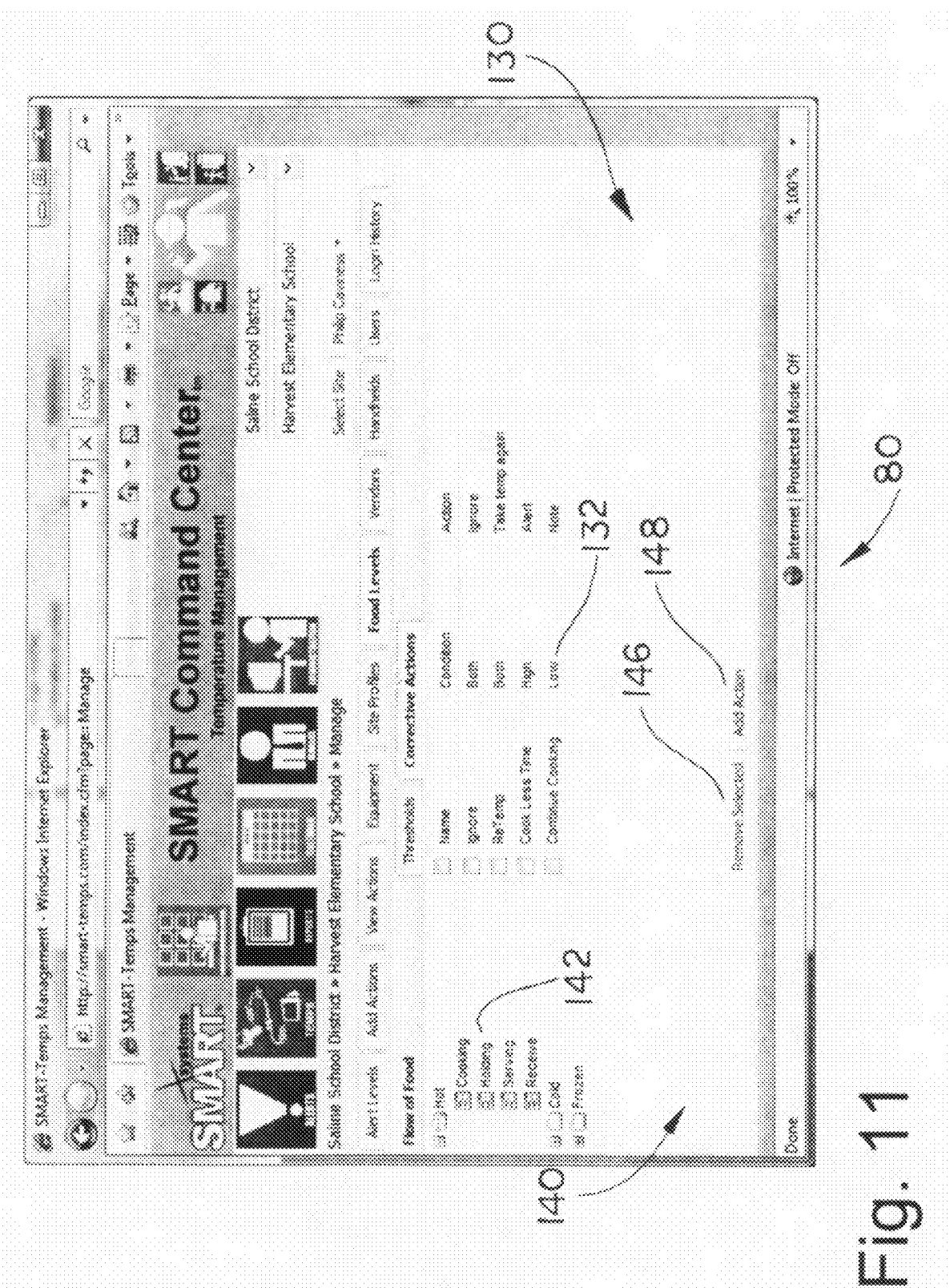
Figure 12:
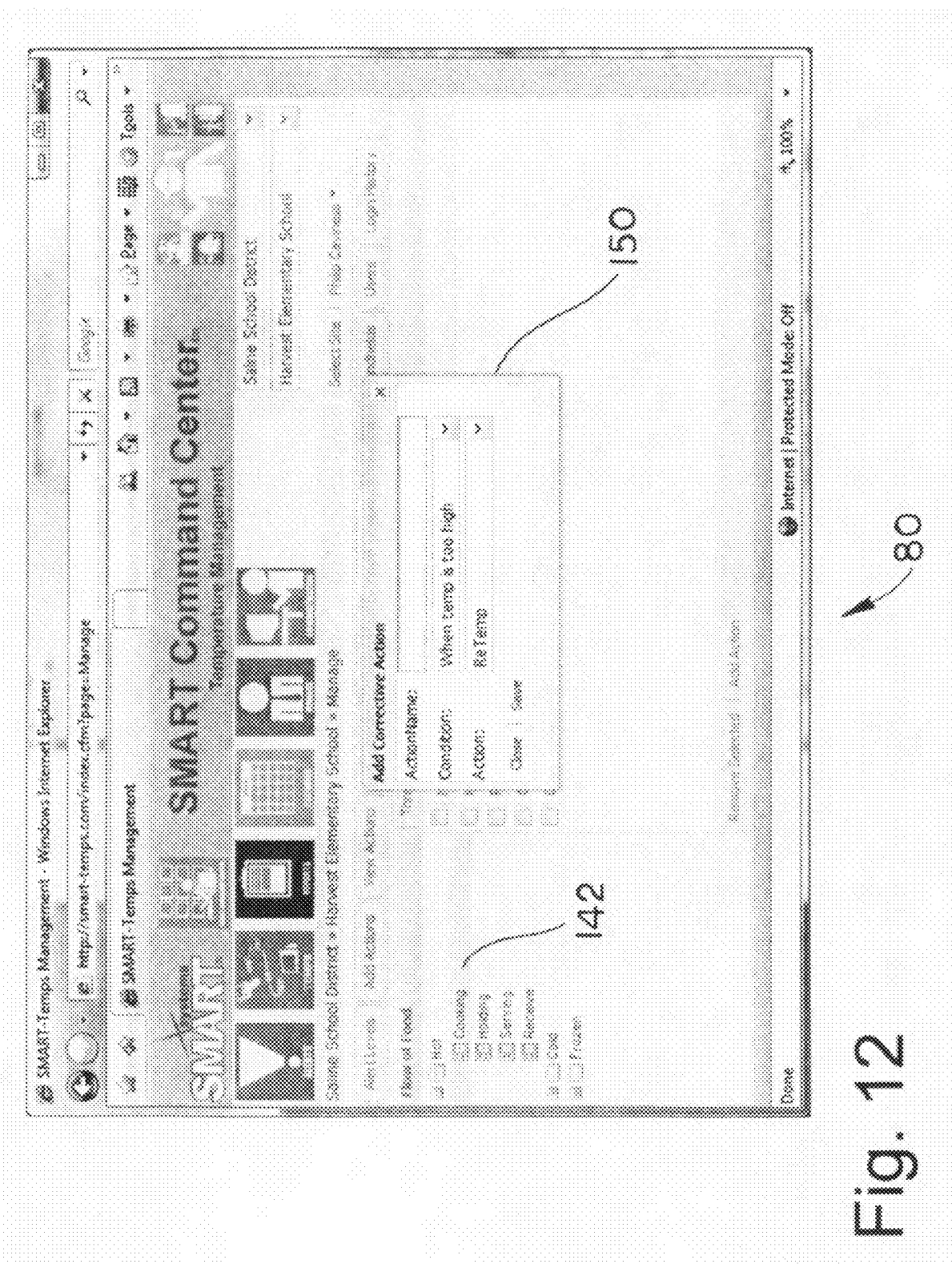

As way of example only, FIGS. 8-12 show various screen shots from an embodiment of user interface 80, which illustrates how an administrator/user can customize database 70 for specific needs. FIGS. 8 and 9 show screen shots of user interface 80 having a listing of food items 112 in left window pane 110 and a listing of menu items 122 for each day in right window pane 120. Administrator/user may simply drag and drop selected food items 112 from food item window pane 110 into menu window pane 120 to add selected food items 112 to that day's menu 122. FIG. 10 shows a screen shot of user interface 80 where administrator/user can set and modify temperature threshold parameters for various flow of food process, locations and steps. As shown, threshold temperatures for cooking all food items are set at a high of 180° and a low of 150°. FIGS. 11 and 12 show screen shots of user interface 80 where corrective actions for various flow of food processes, locations and steps are listed and created. FIG. 11 specifically shows four corrective actions 132 displayed in right window pane 130 defined for the "Cooking" 142 of the flow of food process displayed in left window pane 140. Administrator/user can delete or add corrective actions by clicking on tab buttons 146 and 148 at the bottom of window pane 130. FIG. 12 shows a pop-up window pane 150 where new corrective actions may be added for "Cooking" 142 as the selected flow of food process in window pane 140.

More importantly, information system 10 allows SFA administrator/users to remotely configure and reconfigure each TMD 20 as needed for their particular application using website interface 80. As mentioned above, SFA administrator/users can create and define unique "device data packets"

for each temperature control device 20. Again, these unique "device data packets" may include updated firmware for the devices, graphic user interface menus, database fields, identifiers and indexes, as well as, any food item lists, daily food menus, corrective action lists, user lists, threshold parameters and any other defined device and database settings and parameters that the SFA administrator/user may have created, modified or defined for that TMD 20. For example, an SFA administrator/user may create a device data packet for a TMD that will be used for one of the day's hot food service lines. This device data packet may include updated firmware having new or modified operational prompts and menus that are particular to that TMD and its application. The device data packet may also include database information that is particular to that TMD and its intended use, such as, a list of authorized TMD users, a list of food items that lists only the hot food items served in a particular service line for that day along with the appropriate corrective actions associated for each of the hot food items. Similarly, SFA administrator/users may also create another device data packet for a different TMD that will be used for the same day's cold food service line. This device data packet would again include any upgraded firmware having new or modified operational prompts and menus, but also include updated database information particular to the cold food service line, such as a data list of only the cold food items served in that particular service line and a data list of the appropriate corrective actions associated for each of the cold food items.

Figure 13:
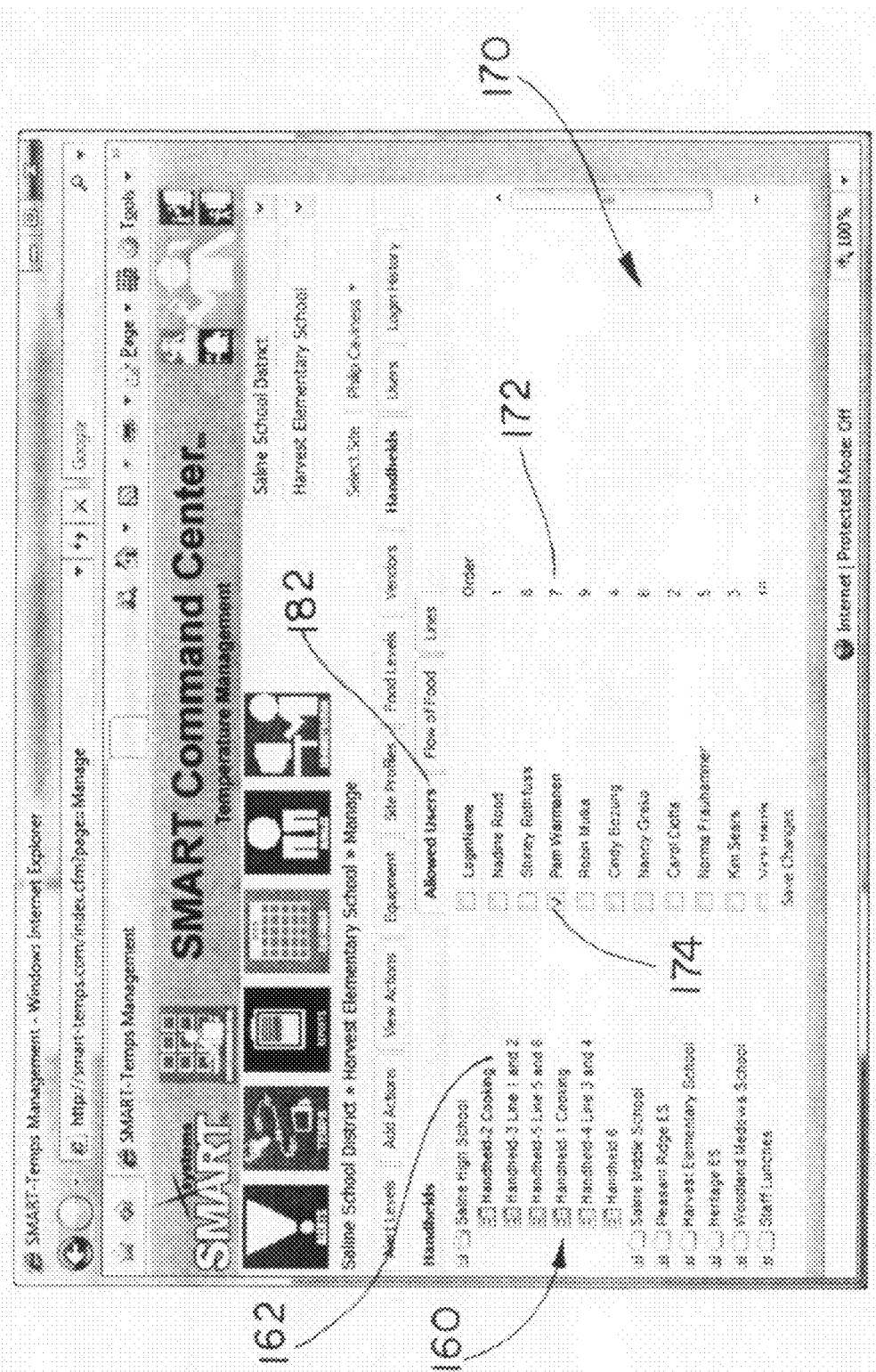
FIGS. 13-15 are screen shots of an embodiment of the Internet-based user interface of this invention, which illustrate how an administrator/user can create, modify and customize data packets for specific TMD.
Figure 14:
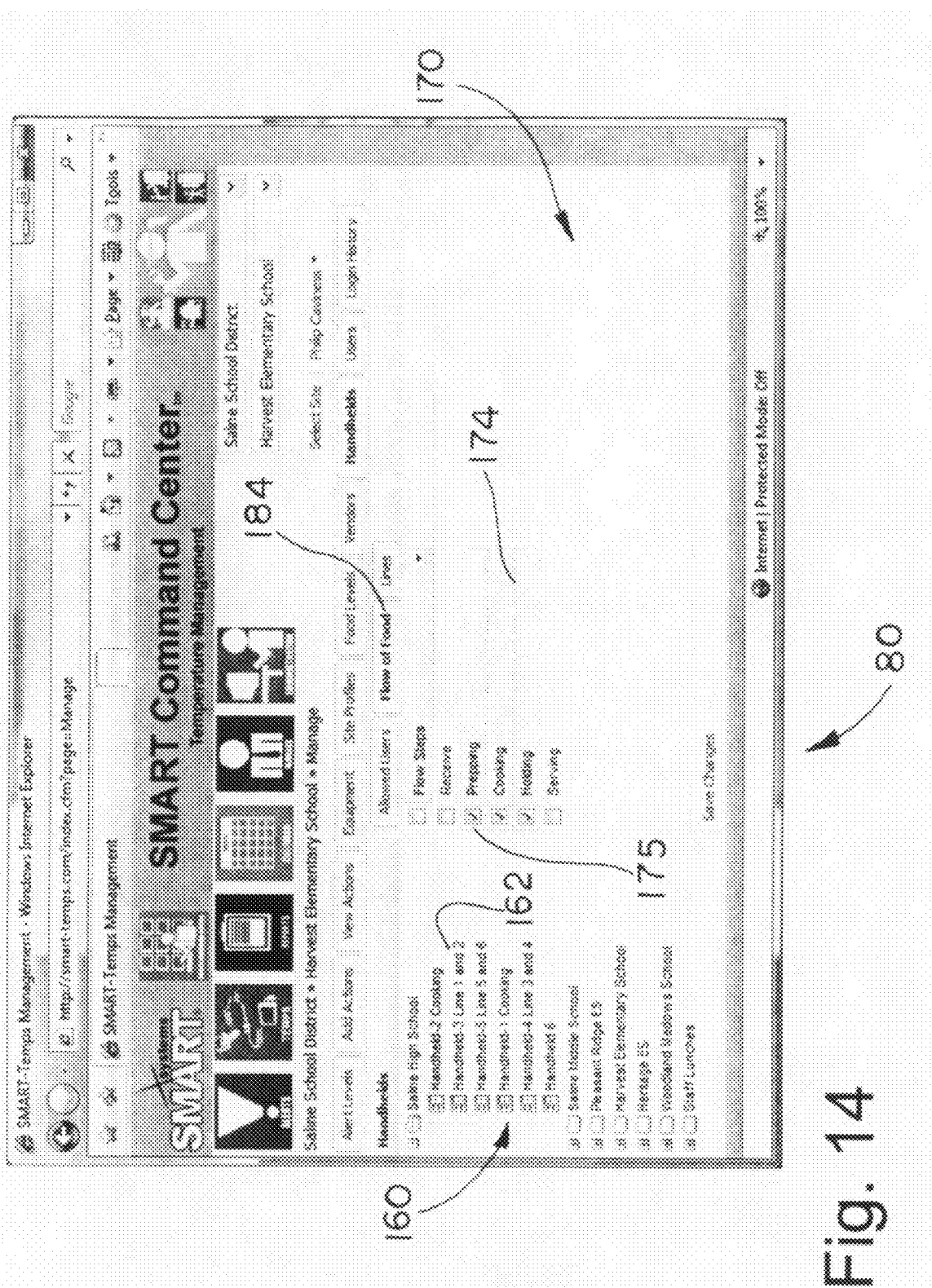
Figure 15:
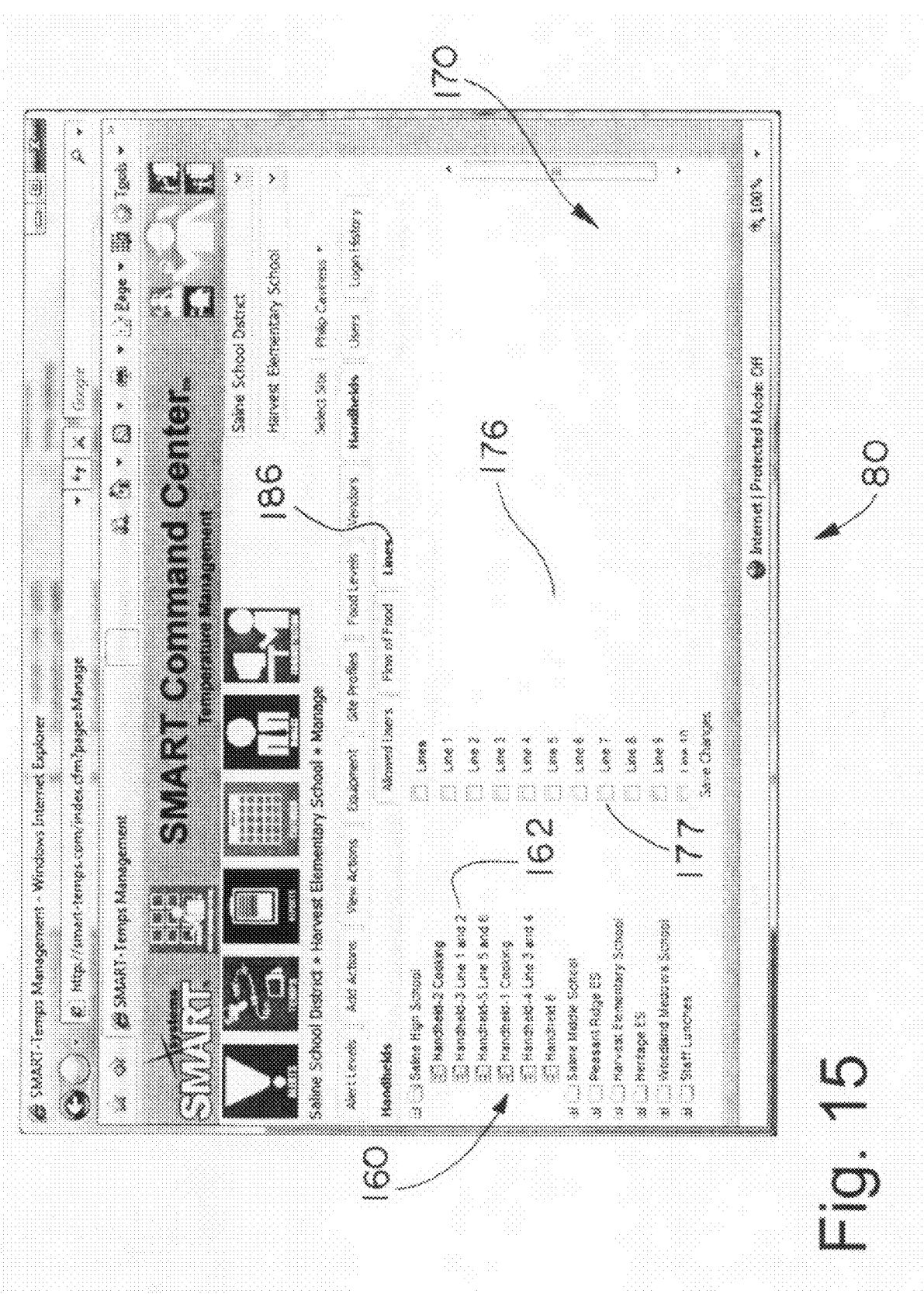

As way of example only, FIGS. 13-15 show various screen shots from an embodiment of user interface 80, which illustrate how an administrator/user can create, modify and customize data packets for specific TMDs 20. FIG. 13 shows a screen shot of user interface 80 where administrator/users can define authorized users for each TMD 20. As shown, user interface 80 has a listing of specific TMDs 162 in left window pane 160 and a listing of authorized TMD users 172 in right window pane 170. Accessed from tab button 182, administrator/user can simply click a check box 174 to add the selected user to the authorized list for the selected TMD 162. FIG. 14 shows a screen shot of user interface 80 where administrator/users can define which flow of food process steps for each TMD. As shown, user interface 80 has a listing of specific TMDs 162 in left window pane 160 and a listing of flow of food processes 174 in right window pane 170. Accessed through tab buttons 184, administrator/user can simply click a check box 165 to add the selected flow of food process to the authorized list of functions for the selected TMD 152. FIG. 15 shows a screen shot of user interface 80 where administrator/users can define a particular food service line for each TMD. As shown, user interface 80 has a listing of specific TMDs 162 in left window pane 160 and a listing of food service lines 168 in right window pane 170. Accessed through tab buttons 186, administrator/user can simply click a check box 177 to assign the selected food service line 176 to the selected TMD 162.

Once created and/or modified by the SFA administrator/user within user interface 80, each unique device data packet is stored within database 70 on web server 60. Upon powered up, initialized or as manually initiated by a TMD user, TMDs 20 transmit a "data packet update requests" to com/data link 40. Com/data links 40 immediately uploads the "data packet update request" for each requesting TMD 20 to web server 60. Upon receipt, web server 60 immediately compiles and downloads a current data packet for each requesting TMD 20 to com/data link 40, which immediately transmits the current data packet to the requesting TMD. Once received, TMD 20 installs the current data packet, reinitializes and enters its operational state.

Referring now to FIGS. 16-19, flowcharts of method steps for which an administrator/user utilizes the information system 10 are shown in accordance with the illustrated embodiment of FIGS. 1-15. The flowcharts are presented for purposes of illustration, and in alternative embodiments of this invention may readily include other steps and sequences than those discussed in conjunction with FIGS. 16-19.

Figure 16:
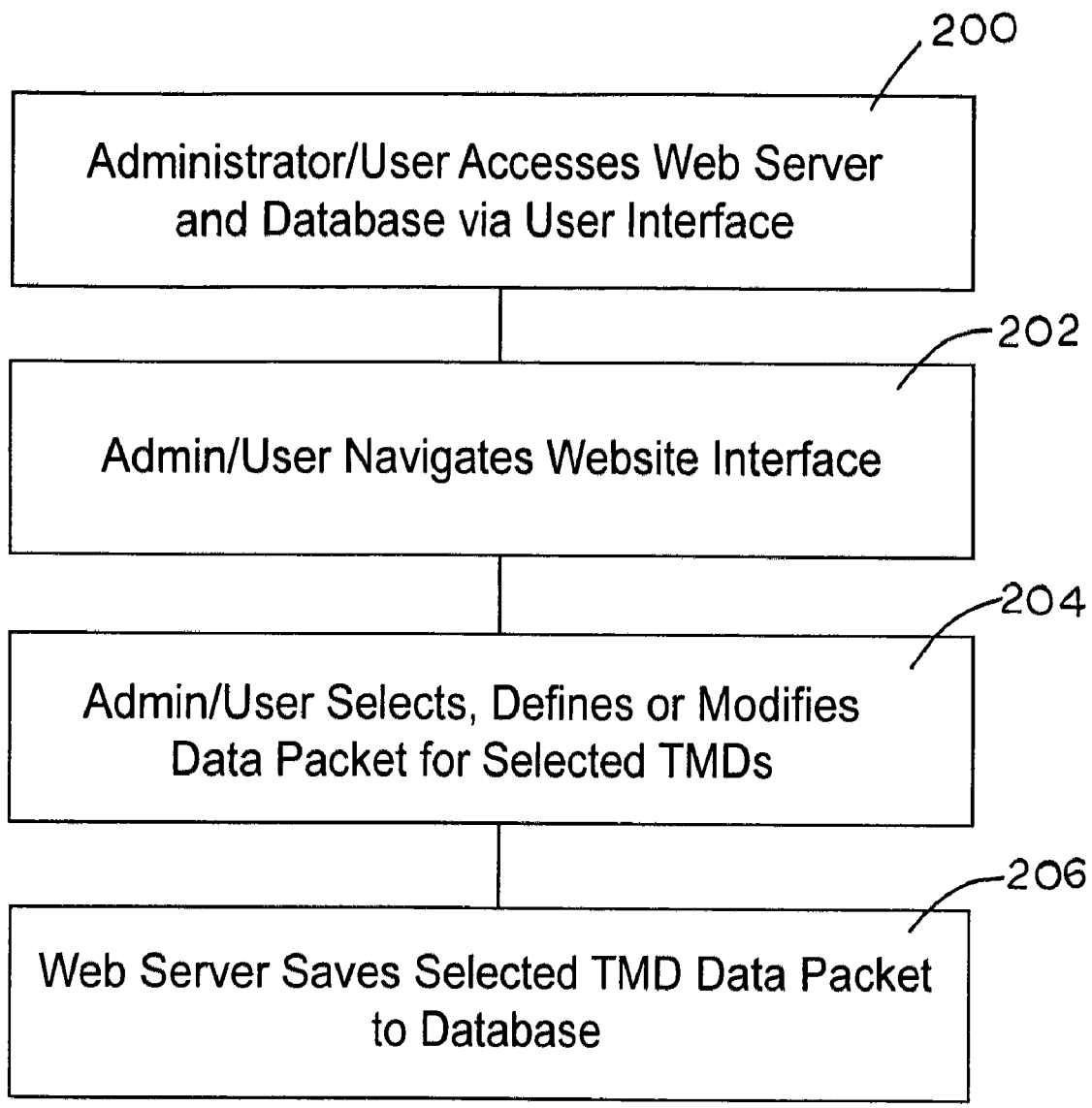
FIG. 16 is a flow chart illustrating the basic method steps for an administrator/user using the Internet-based user interface to define or modify a data packet for a selected TMD.

FIG. 16 is a flow chart illustrating the basic method steps for an administrator/user using user interface 80 to define or modify a data packet for a selected TMD 20. In step 200, administrator/user gains access to web server 20 and database 70 through Internet-based user interface 80. Next in step 202, administrator/user navigates through the web pages of user interface 80. In step 204, administrator/user selects, defines or modifies the data packet for a selected TMD 20, which may include such information, as food items lists, daily food menus, corrective action lists, user lists, threshold parameters and any other defined device and database settings and parameters. In step 206, web server 20 automatically saves and stores the data packet for the selected TMD 20.

Figure 17:
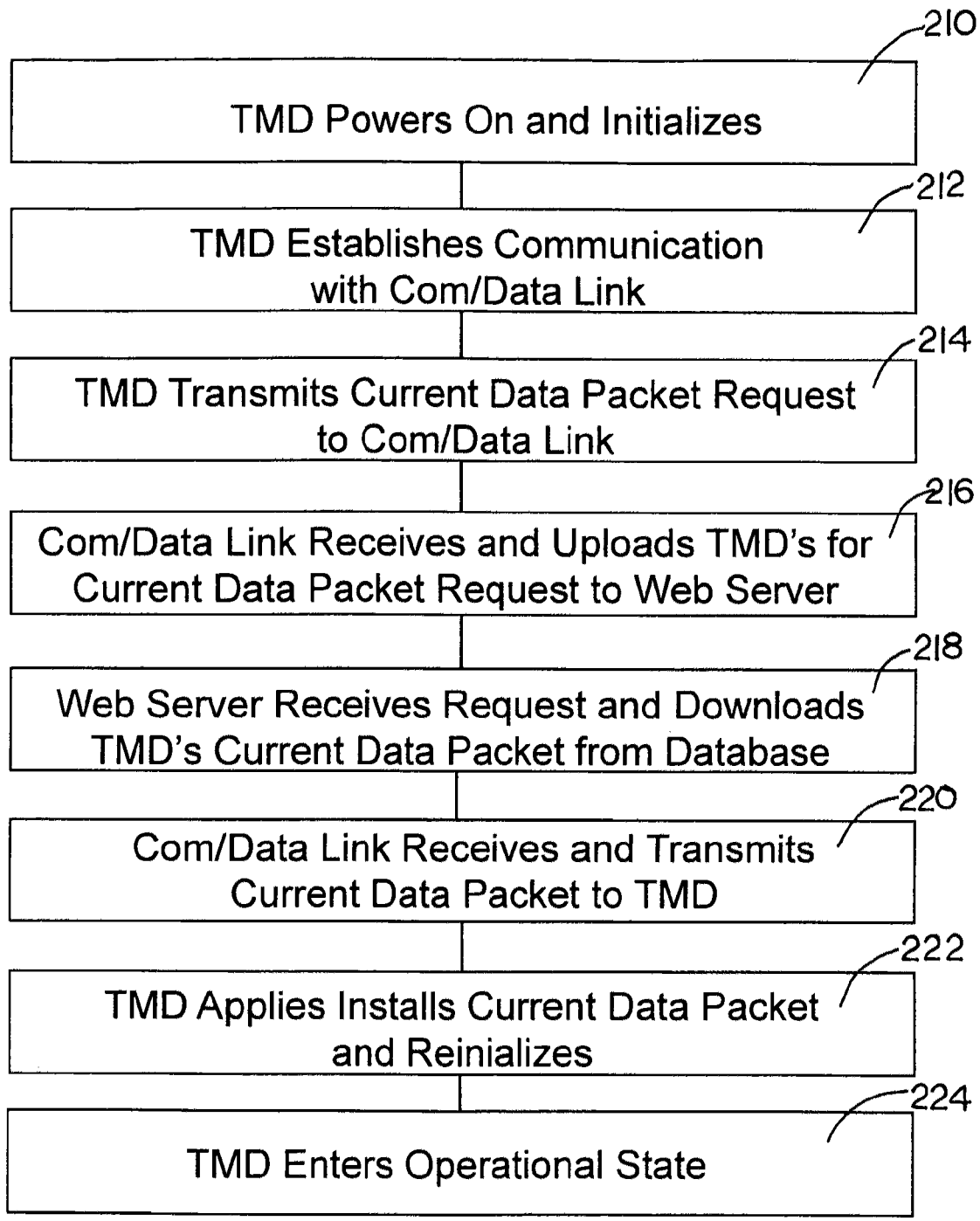
FIG. 17 is a flow chart illustrating the basic method steps for updating the data packets of a TMD.

FIG. 17 is a flow chart illustrating the basic method steps for updating the data packets of TMD 20. In step 210, a TMD user powers up or reinitializes the TMD 20. Once powered up in step 212, TMD 20 establishes communication with com/data link 40. Typically, TMD 20 initiates an arbitration procedure to establish communications with local com/data link 40. The arbitration procedure ensures that each measurement device has a unique identifier, which distinguishes it from other measurement devices that may be communicating with local com/data link 40. In step 214, TMD 20 transmits a "Current Data Packet Request" to com/data link 40. The transmission of the "Current Data Packet Request" can be automatically initiated upon initiation of TMD 20 or at predetermined times or conditions. The request can also be manually initiated by the TMD user through the various device controls. In step 216, com/data link forwards the TMD's Current Data Packet Request to web server 60. In step 218, web server 60 received the TMD's Current Data Packet Request and downloads the TMD's Current Data Packet from database 70 to com/data link 40. In step 220, com/data link 40 receives and forwards the TMD's Current Data Packet to TMD 20. In step 222, TMD 20 receives and automatically installs the Current Data Packet into systems memory 32 and reinitializes. In step 224, the TMD enters into its operational state loading with all current database information and ready to collect temperature readings.

Figure 18:
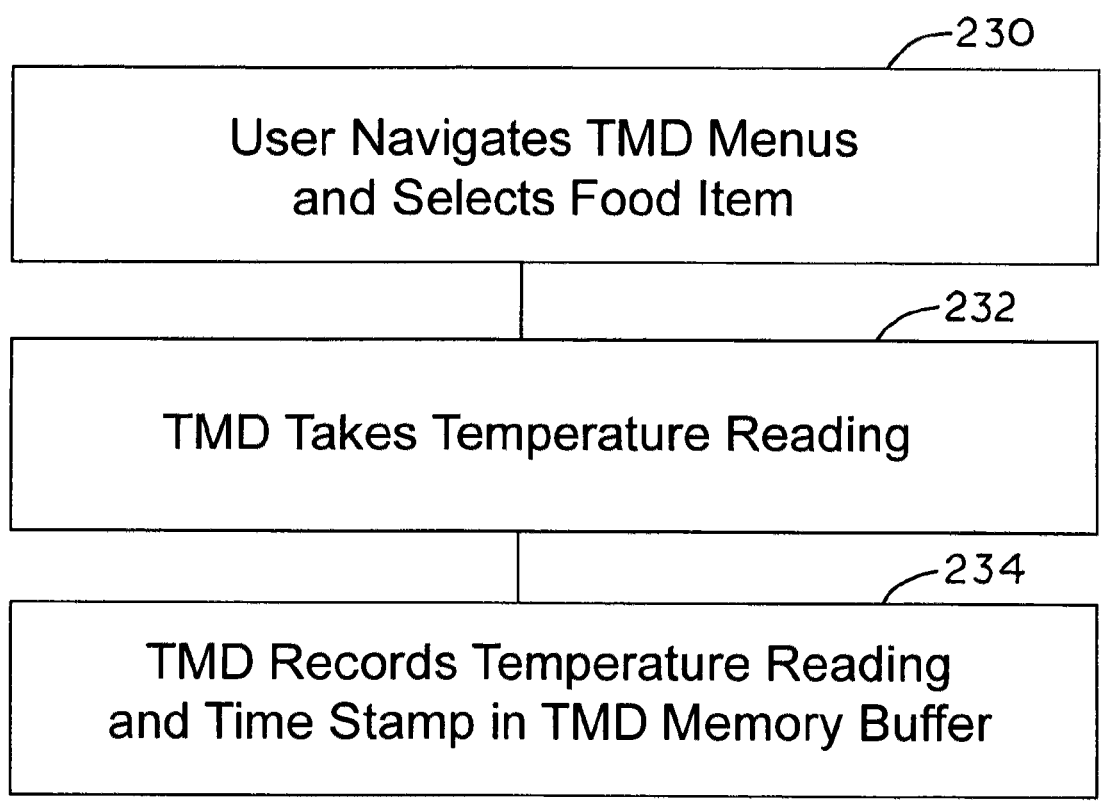
FIG. 18 is a flow chart illustrating the basic method steps for using a TMD to collect temperature readings.

FIG. 18 is a flow chart illustrating the basic method steps for using TMD 20 to collect temperature readings. Once TMD 20 is in its operational state with its current data packet install into system memory 32 in step 230, the TMD user can manually navigate through the device menus and select the food item for the flow or food process for which a temperature reading will be taken. In step 232, TMD 20 takes a temperature reading. The temperature reading may be manually initiated using selector buttons 28 for handheld TMD units or may be initiated automatically at predetermined times or conditions for fixed TMD units. In step 234, TMD 20 records the temperature reading and a time stamp of when the reading was taken in data buffer 34. Once the temperature reading and time stamp are recorded, TMD 20 is ready to take another temperature reading.

Figure 19:
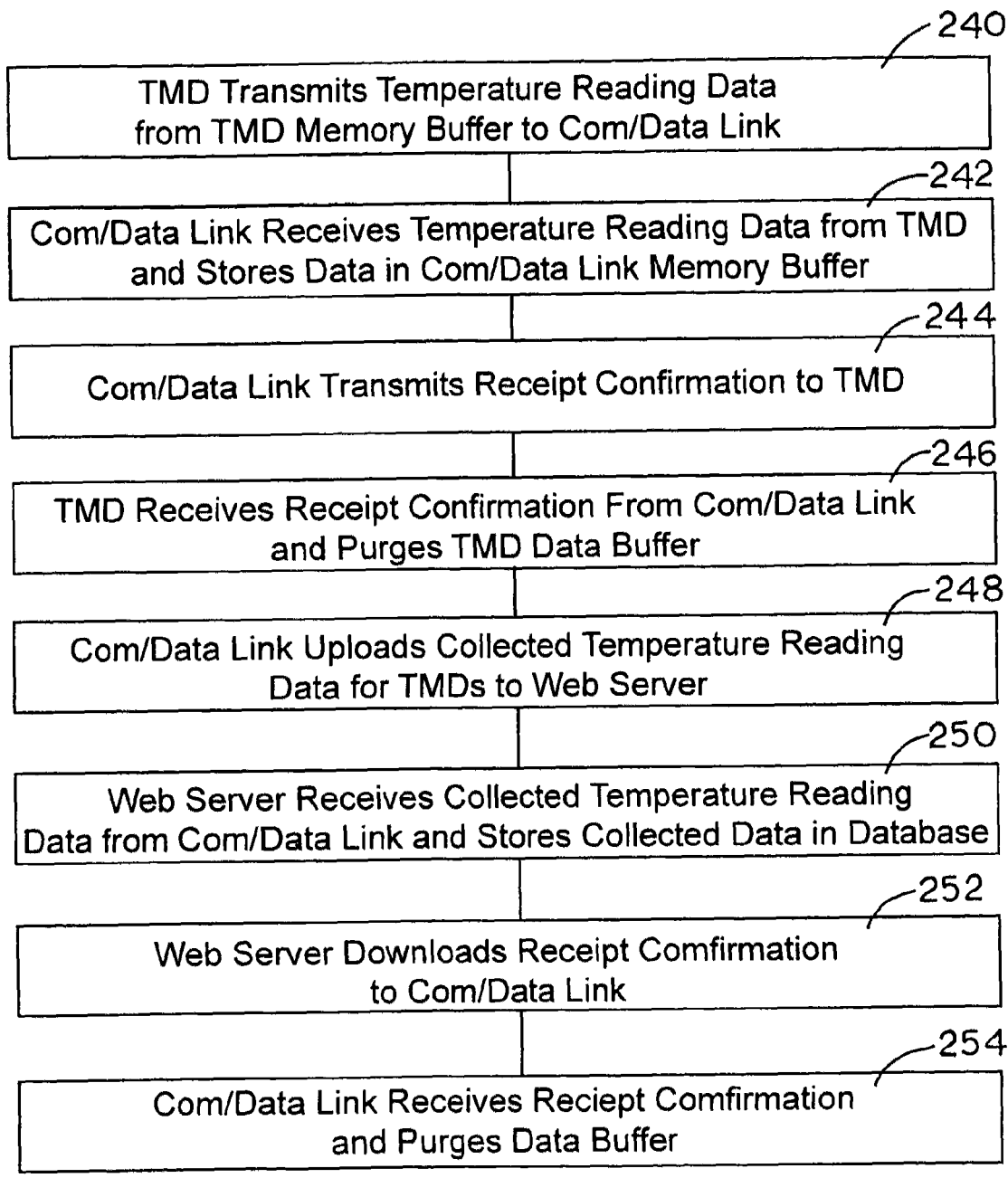
FIG. 19 is a flow chart illustrating the basic method steps for transferring the collected temperature readings and time stamps from a TMD to the web server.

FIG. 19 is a flow chart illustrating the basic method steps for transferring the collected temperature readings and time stamps from TMD 20 to web server 60. In step 240, TMD 20 transmits all of the collected temperature readings and time stamps from data memory 34 to com/data link 40. The transmission from TMD 20 to com/data link 40 may be initiated manually using selector buttons 28 or may be automatically initiated at predetermined times or conditions. In step 242, com/data link 40 receives and temporarily stores the collected temperature readings and time stamps for TMD 20 in data buffer 54. In step 244, com/data links transmits a "Receipt Confirmation" back to TMD 20, once the collected temperature readings and time stamps are received by com/data link 40. In step 244, TMD 20 purges all temperature readings and time stamps form data buffer 34 upon receipt of the "Receipt Confirmation" from com/data link 40. In step 248, com/data link 40 uploads all of the collected temperature readings and time stamps that are stored in data buffer 54 from all of TMDs 20 to web server 60. Again, the transfer of collected temperature readings and time stamps from com/data link 40 to web server 60 may be initiated manually using selector button 34 or may be automatically initiated at predetermined times or conditions. In step 250, web server 60 receives and stores the collected temperature readings and time stamps for all of com/data links 40 in database 70. In step 252, web server 60 downloads another "Receipt Confirmation" back to com/data link 40, once the collected temperature readings and time stamps are received by web server 60. In step 254, com/data 40 purges all temperature readings and time stamps from data buffer 54 upon receipt of the "Receipt Confirmation" from web server 60.

One skilled in the art will note several advantages of the present invention over conventional information systems and methods for collecting, transferring and administrating HACCP data for safety and quality control and assurance programs. The present invention provides an efficient and effective way to circumvent certain burdensome difficulties often associated with storing and transferring data between collection devices and databases. Instead, the present invention provides a user-friendly, trouble-free, and cost-effective method for transferring, accessing and managing data collected from wireless measurement devices to a web server with an Internet based Website user interface. The information systems allow administrators and users to customize parameters for multiple processes at multiple physical locations by placing a local com/data link at each process location and provides the necessary number of wireless measurement devices. The local com/data link facilitates bi-directional communication between the web server and each wireless measurement device. Administrators and users can use website interface to remotely configure and reconfigure each wireless measurement device regardless of where the devices are physically located. The Internet based database and website interface provides centralized data storage and easily accessible data administration and analysis. Administrators and users of the system can access and manage the data from any location or device with Internet connectivity. The information system reduces the risk of data loss. Data backups are provided and maintained for the database on the web server. In addition, the use of data buffers in both the local com/data link and each measurement devices reduces the chance of data loss before or during transmission to the web server. Because data buffers are purged after data transfer confirmations are received, both the measurement devices and the com/data link have ample memory for storing collected data.

With respect to the embodiment of this invention presented as an information system for a food safety program, the system and method allow SFA administrators and users to easily collect, transfer and manage temperature measurement data for each specific data item across the entire flow of food process. The food safety information systems allows this temperature data to be collected and managed from multiple temperature measurement devices (TMDs) at multiple locations for any number of data items at every stop of the flow of food process. The Internet-based user interface afford administrator/users the ability to modify and customize database information to suit their particular food safety program and requirements. Moreover, the bi-directional communication of the information system allows the remote wireless temperature measurement devices (TMDs) to be remotely configured and modified by administrator/users through the Internet-based user interface, which saves time and labor. The remote customization of the TMDs at an administrative level ensures procedural compliance at the TMD user level. Temperate data is transferred automatically between the TMDs and the web server reducing the possibility of user error and data loss. Because both the TMDs and the com/data link have data buffers, the information system further lessens the possibility of data loss.

The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

We claim:

1. An Internet based information system for collecting, transferring and managing data from remote physical client locations comprising:

a plurality of measurement devices located at a first physical location for taking measurement readings and associating the measurement readings to data fields selected by users at the first physical location, and for temporarily storing and transmitting measurement reading data associated with the data fields, each of the plurality of measurement devices being reconfigurable by receiving and initializing user defined data packets that set and control the data fields available to users at the first physical location for which the measurement readings are associated, whereby the operation and function of each of the plurality of measurement devices can be selectively re-tasked;

a web server located at a second physical location remotely located from the first physical location hosting a database for storing and managing measurement readings and the data packets for each of the plurality of measurement devices and also for hosting a user interface for accessing the database and for creating and modifying the data packets for each of the plurality of measurement devices; and a com/data link located at the first physical location for providing bi-directional communication between the web server and each of the plurality of measurement devices to transfer the measurement readings and the data packets between the plurality of measurement devices and the web server so that the measurement readings and the data packets for each of the plurality of the measurement devices are only temporarily stored on each of the plurality of measurement devices at the first physical location but permanently stored on the web server at the second physical location.

2. The information system of claim 1 wherein the com/data link includes a first communication means for wirelessly communicating with the plurality of measurement devices and second communication means for communicating with the web server via an Internet connection.

3. The information system of claim 1 wherein each of the measurement devices includes a data buffer for temporarily storing the measurement reading data.

4. The information system of claim 1 wherein the com/data link includes a data buffer for temporarily storing measurement reading data.

5. The information systems of claim 1 wherein the measurement readings are temperature readings.

6. A method of collecting and transferring measurement data at a first physical location while storing and managing the measurement data remotely at a second physical location using an internet based information system, the method comprising the steps of:
   A. Providing a wireless measurement device located at the first physical location, a web server located at the second physical location for storing the measurement data in a database, an internet based user interface operatively associated with the web server for allowing remote access and management of the measurement data stored in the database, and a com/data link located at the first physical location for bidirectional communication between the measurement device and the web server via an internet connection, the measurement device for taking measurement readings and associating the measurement readings with one or more data fields;
   B. Defining the data fields and creating a data packet remotely using the internet based user interface for selectively tasking the wireless measurement device, where only certain of the data fields are selected to be available to the measurement device;
   C. Transmitting via wireless communication a data packet request from the wireless measurement device to the com/data link;
   D. Uploading via the Internet connection the data packet request from the com/data link to the web server;
   E. Downloading via the Internet connection the data packet from the web server to the com/data link;
   F. Transmitting via wireless communication the data packet from the com/data link to the wireless measurement device;
   G. Installing and initializing the data packet to the wireless measurement device so that only the certain of the data field are available to the measurement device;
   H. Activating the wireless measurement device to an operational state;
   I. Manually selecting the data field for which a measurement reading will be associated on the wireless measurement device;
   J. Taking a measurement reading and associating the measurement reading to the selected data field using the wireless measurement device;
   K. Temporarily storing a measurement reading data for the selected data field on the wireless measurement device;
   L. Transmitting via wireless communication the measurement reading data for the selected data item data from the wireless measurement device to the com/data link;
   M. Temporarily storing the measurement reading data for the selected data field on the com/data link;
   N. Uploading via the Internet connection the measurement reading data for the selected data field from the com/data link to the web server; and
   O. Storing the measurement reading for the selected data field in the database on the web server.

7. The method of claim 6 wherein step L also includes purging the measurement reading data for the selected data field from the wireless measurement device once the measurement reading is received by the com/data link.

8. The method of claim 6 wherein Step N also includes purging the measurement reading data for the selected data field from com/data link once the measurement reading is received by the web server.

9. The method of claim 6 wherein steps J, L and N are initiated at predetermined time intervals and conditions.

10. The method of claim 6 wherein steps J, L and N are initiated manually.

11. A method of collecting and transferring measurement data at a first physical location while storing and managing the measurement data remotely at a second physical location using an internet based information system, the method comprising the steps of:
   A. Providing a plurality of wireless measurement device located at the first physical location, a web server located at the second physical location for storing the measurement data in a database, an internet based user interface operatively associated with the web server for allowing remote access and management of the measurement data stored in the database, and a com/data link located at the first physical location for bidirectional communication between the measurement device and the web server via an internet connection, the plurality of measurement devices for taking measurement readings and associating the measurement readings to one or more data fields;
   B. Defining the data fields and creating a data packet remotely using the Internet based user interface for selectively tasking each of the plurality of wireless measurement devices, where only certain of the data fields are selected to be available to each of the measurement device;
   C. Transmitting via wireless communication a data packet request from each of the plurality of wireless measurement devices to the com/data link;
   D. Uploading via the Internet connection the data packet request from each of the plurality of wireless measurement devices from the com/data link to the web server;
   E. Downloading via the Internet connection the data packet for each of the plurality of wireless measurement devices from the web server to the com/data link;
   F. Transmitting via wireless communication the data packet for each of the plurality of wireless measurement devices from the com/data link respectively to each of the plurality of wireless measurement devices;
   G. Installing and initializing the data packet for each of the plurality of wireless measurement devices from the com/data link respectively to each of the plurality of wireless measurement devices so that only the certain of the data fields are available to each of the plurality of wireless devices;
   H. Activating each of the plurality of wireless measurement devices to an operational state;
   I. Manually selecting the data fields for which a measurement reading will be associated from each of the plurality of wireless measurement devices;
   J. Taking a measurement reading and associating the measurement radings to the selected data field on each of the plurality of wireless measurement devices;
   K. Temporarily storing a measurement reading data for the selected data field on each of the plurality of wireless measurement devices;
   L. Transmitting via wireless communication the measurement reading data for the selected data field from each of the plurality of wireless measurement devices to the com/data link;

M. Temporarily storing the measurement reading data for the selected data field from each of the plurality of wireless measurement devices on the com/data link;

N. Uploading via the Internet connection the measurement reading data for the selected data field from each of the plurality of wireless measurement devices from the com/data link to the web server; and O. Storing the measurement reading data for the selected data field from each of the plurality of wireless measurement devices in the database on the web server.

12. The method of claim 11 wherein step L also includes purging the measurement reading data for the selected data field from each of the plurality of wireless measurement devices once the measurement reading data is received by the com/data link.

13. The method of claim 11 wherein Step N also includes purging the measurement reading data for the selected data field from com/data link once the measurement reading data is received by the web server.

14. The method of claim 11 wherein steps J, L and N are initiated at predetermined time intervals and conditions.

15. The method of claim 11 wherein step J, L and N are initiated manually.

16. A method, the method comprising the steps of:
   A. Providing a plurality of wireless temperature measurement device (TMDs) located at the first physical location, a web server located at the second physical location for storing the measurement data in a database, an internet based user interface operatively associated with the web server for allowing remote access and management of the measurement data stored in the database, and a com/data link located at the first physical location for bidirectional communication between the measurement device and the web server via an internet connection the plurality of TMDs for taking measurement readings and associating the measurement readings to one or more data fields;
   B. Defining the data fields and creating a data packet for selectively tasking each of the plurality of TMDs, where only certain of the data fields are selected to be available to each of the plurality of TMDs;
   C. Transmitting via wireless communication a data packet request from each of the plurality of TMDs to the com/data link;
   D. Uploading via the Internet connection the data packet request from each of the plurality of TMDs from the com/data link to the web server;
   E. Downloading via the Internet connection the data packet for each of the plurality of TMDs from the web server to the com/data link;
   F. Transmitting via wireless communication the data packet for each of the plurality of TMDs from the com/data link respectively to each of the plurality of TMDs;
   G. Installing and initializing the data packet for each of the plurality of TMDs from the com/data link respectively to each of the plurality of TMDs so that only the certain of the dat fields are available to each of the plurality of TMDs;
   H. Activating each of the plurality of TMDs to an operational state;
   I. Manually selecting the data field for which a measurement reading will be taken from each of the plurality of TMDs;
   J. Taking a measurement reading data for the selected data field on each of the plurality of TMDs;
   K. Temporarily storing a measurement reading data for the selected data field on each of the plurality of TMDs;
   L. Transmitting via wireless communication the measurement reading data for the selected data field from each of the plurality of TMDs to the com/data link;
   M. Temporarily storing the measurement reading data for the selected data field from each of the plurality of TMDs on the com/data link;
   N. Uploading via an Internet connection the measurement reading data for the selected data field from each of the plurality of TMDs from the com/data link to the web server; and
   O. Storing the measurement reading data for the selected data field from each of the plurality of TMDs in the database on the web server.

17. The method of claim 16 wherein step L also includes purging the measurement reading data for the selected data field from each of the plurality of TMDs once the measurement reading data is received by the com/data link.

18. The method of claim 16 wherein Step N also includes purging the measurement reading data for the selected data field from the com/data link once the measurement reading data is received by the web server.

* * * * *